E. AKER.
FEED RACK.
APPLICATION FILED JULY 31, 1916.
1,265,025.
Patented May 7, 1918.
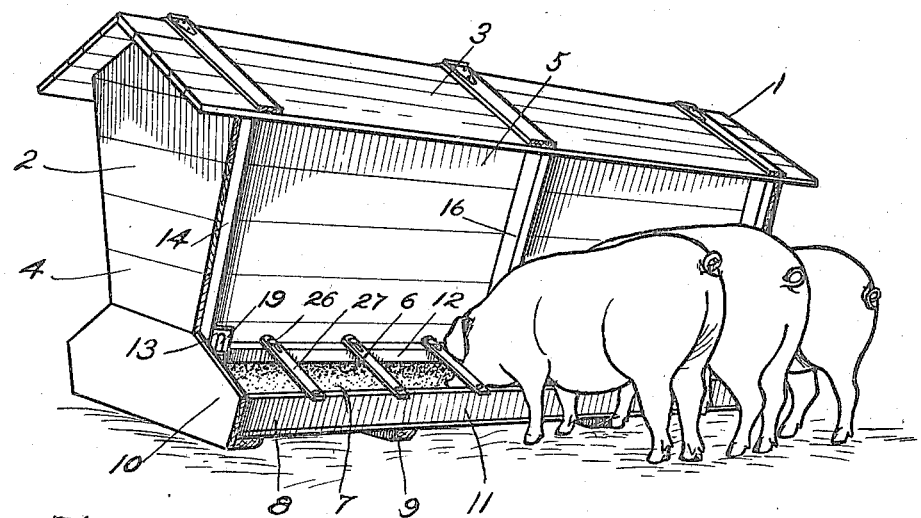
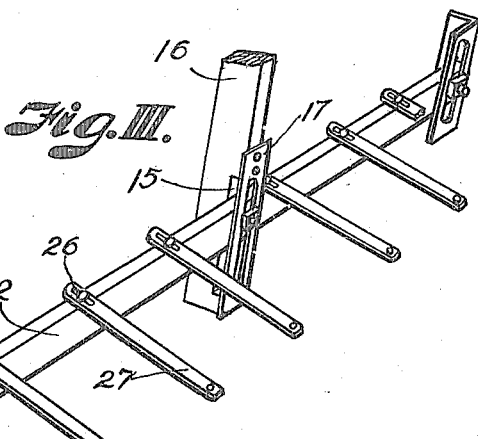
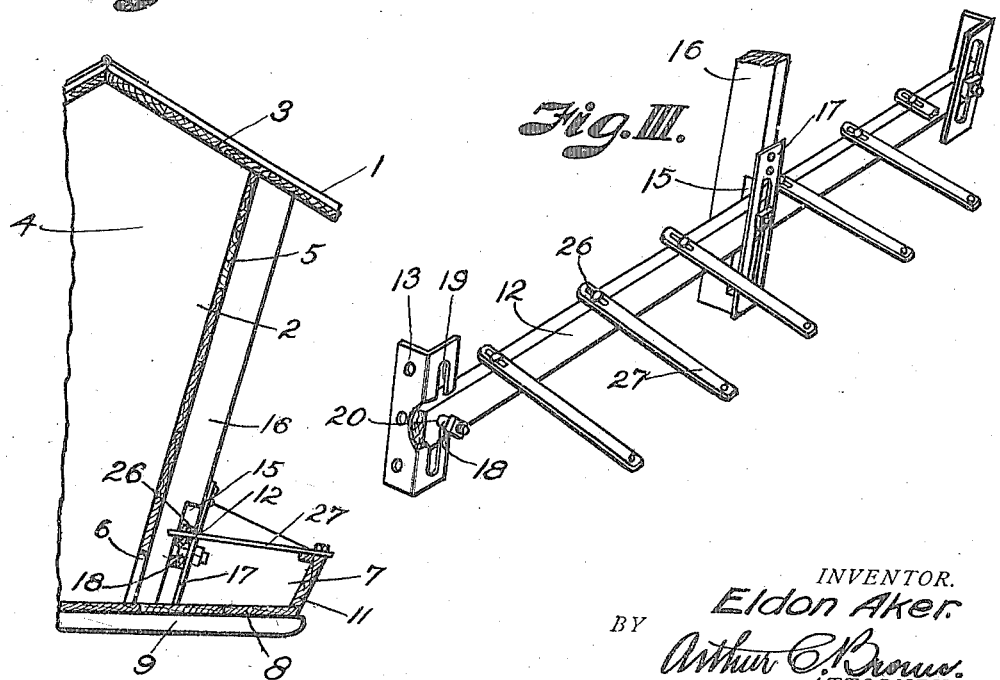
INVENTOR.
Eldon Aker
BY Arthur C. Brown.
ATTORNEY

UNITED STATES PATENT OFFICE.

ELDON AKER, OF SMITHVILLE, MISSOURI.

FEED-RACK.

1,265,025.　　　Specification of Letters Patent.　　Patented May 7, 1918.

Application filed July 31, 1916. Serial No. 112,343.

*To all whom it may concern:*

Be it known that I, ELDON AKER, a citizen of the United States, residing at Smithville, in the county of Clay, and State of Missouri, have invented certain new and useful Improvements in Feed-Racks; and I do declare the following to be a full, clear, and exact description of the invention such as will enable others skilled in the art to which it appertains to make and use the same, reference being had to the accompanying drawings, and to the letters and figures of reference marked thereon, which form a part of this specification.

My invention relates to stock feed racks, and more particularly to a rack of this character for feeding swine, the principal object of the invention being to provide a device whereby the feed may be continuously supplied as it is consumed in such a manner that an animal can neither soil the feed nor interfere with the flow of feed from the storage member of the rack.

It is also an object of the invention to provide a device of this character, which may be adjusted to adapt it for different kinds of feed.

In accomplishing these objects, I have provided improved details of structure, the preferred form of which is illustrated in the accompanying drawings, wherein:—

Figure I is a perspective view of a feed rack constructed according to my invention.

Fig. II is a transverse vertical section of the same showing the feed check bar and trough spacers.

Fig. III is a detail perspective view of the adjustable check bar, and its supporting plates.

Referring more in detail to the drawings:—

1 designates a feed rack embodying my invention, comprising a hopper 2, having hinged cover members 3, by which access is had to the interior of the hopper, end walls 4 and sides 5, which latter are preferably inclined inwardly and downwardly, and are provided at their bottom edges with longitudinal discharge openings 6 through which feed stored in the hopper may be delivered into feed troughs 7, that are located below and at the sides of the hopper.

Each trough 7 comprises a bottom section 8, which extends beyond the hopper walls at the sides of the hopper and is built on skids 9 to facilitate movement of the feeder from place to place, the ends and sides of the troughs being closed by end boards 10 and side boards 11 respectively.

It is apparent that with this construction, grain placed within the hopper will flow through the openings 6 into the troughs 7, and that coarse feed such as corn will flow farther and freer than ground feed, so that stock feeding from the trough might soil and waste the feed, unless the device is provided with a guard of some kind. In order to prevent such soiling and wasting of the feed, and to prevent excess supply to the troughs, I have provided each trough with a check bar 12 at each side of the hopper adjacent the openings 6, which are spaced from the hopper wall and are slidably supported at their ends along angle members 13, which are secured on the inner faces of end studs 14 of the hopper 2; the bars 12 also being slidable in sockets 15 cut out of the intermediate studs 16 and secured therein by overlying slotted strips 17, so that they may be adjusted vertically, and secured in any desired position by bolts 18, which may be projected through the slots 19 in the outer flanges of the angle members, and slotted strips 17 and through registering apertures 20 in the check bars.

Pivotally connected with the check bars 12 at regularly spaced intervals by bolt and slot connections 26 and overlying the side boards 11, and pivotally connected thereto are spacing bars 27, by which animals feeding at the rack are prevented from crowding about the hopper and from lying in the feed troughs; the spacing bars being so connected as to permit vertical movement of the check bars 12 in the supporting members when the feed opening is regulated.

Presuming the parts to be so constructed and assembled, a suitable feed, such as shelled corn or other small grain is placed in the hopper 2 through the top openings 3, and is delivered into the feed trough 7, through the side openings 6. The bars 12 are adjusted vertically in their supports in accordance with the flow of the grain, so that the stock may be held at a determined distance from the feed openings, and can only have access to a certain amount of the feed.

It is apparent that with this construction the check bars will prevent the stock from dragging the feed from the hopper in any large quantities, and will consequently cause them to clean up all that is delivered into the trough.

It is also apparent that the spacers will prevent too many feeding at the same time, and will also prevent stock from lying in the feed troughs.

Having thus described my invention what I claim as new therein and desire to secure by Letters-Patent, is:—

1. In a stock feeding device comprising a feed trough, a feed receptacle mounted in the trough and having a longitudinal opening at the base thereof, a vertically adjustable feed control bar slidably mounted in spaced relation to and parallel with the said opening, and spaced division bars mounted transversely across the trough pivotally attached to a wall thereof and slidably attached to said bar.

2. In a stock feeding device comprising a feed trough, a feed receptacle mounted in the trough comprising a side wall having a longitudinal feed opening at the base thereof, supporting studs at the ends of said wall, an intermediate stud on said wall, oppositely disposed angle members secured to said end studs, having slots therein, a feed control bar spaced from said opening and slidably mounted in said angle members and having apertures at its opposite ends registering with the slots of said angle members, bolts projected through the registering slots and apertures to secure said feed control bar in an adjusted position, and spaced division bars slidably secured to said feed control bar and anchored on the outer trough member.

In testimony whereof I affix my signature.

ELDON AKER.

Copies of this patent may be obtained for five cents each, by addressing the "Commissioner of Patents, Washington, D. C."